United States Patent
Laster et al.

(10) Patent No.: US 10,139,111 B2
(45) Date of Patent: Nov. 27, 2018

(54) DUAL OUTLET NOZZLE FOR A SECONDARY FUEL STAGE OF A COMBUSTOR OF A GAS TURBINE ENGINE

(71) Applicant: Siemens Energy, Inc., Orlando, FL (US)

(72) Inventors: Walter R. Laster, Oviedo, FL (US); Scott M. Martin, Daytona Beach, FL (US); Juan Enrique Portillo Bilbao, Oviedo, FL (US); Jacob Hardes, Charlotte, NC (US); Timothy A. Fox, Hamilton (CA)

(73) Assignee: SIEMENS ENERGY, INC., Orlando, FL (US)

( * ) Notice: Subject to any disclaimer, the term of this patent is extended or adjusted under 35 U.S.C. 154(b) by 614 days.

(21) Appl. No.: 14/228,883

(22) Filed: Mar. 28, 2014

(65) Prior Publication Data
US 2015/0276226 A1 Oct. 1, 2015

(51) Int. Cl.
*F23R 3/34* (2006.01)
*F02C 7/22* (2006.01)
*F23R 3/06* (2006.01)
*F23R 3/16* (2006.01)
*F23R 3/28* (2006.01)

(52) U.S. Cl.
CPC .............. *F23R 3/346* (2013.01); *F23R 3/06* (2013.01); *F23R 3/16* (2013.01); *F23R 3/286* (2013.01); *F23R 3/34* (2013.01); *F02C 7/222* (2013.01)

(58) Field of Classification Search
CPC ............ F23R 3/34; F23R 3/346; F02C 7/222
USPC ......................................................... 60/733
See application file for complete search history.

(56) References Cited

U.S. PATENT DOCUMENTS 3,913,318 A * 10/1975 Fox ........................... F23R 3/32
60/738
4,188,782 A * 2/1980 Smith ...................... F23R 3/32
60/733
4,192,139 A * 3/1980 Buchheim ............... F23R 3/346
60/39.826

(Continued)

FOREIGN PATENT DOCUMENTS

CN 102913950 A 2/2013
CN 103459928 A 12/2013

(Continued)

OTHER PUBLICATIONS

PCT International Search Report dated Jun. 29, 2015 corresponding to PCT International Application No. PCT/US2015/022629 filed Mar. 26, 2015 (7 pages).

*Primary Examiner* — Todd E Manahan
*Assistant Examiner* — Eric Linderman

(57) ABSTRACT

A secondary fuel stage (14) of a combustor of a gas turbine engine. The combustor has a main combustion zone (43) upstream of the secondary fuel stage to ignite working gas The secondary fuel stage includes a nozzle (18) with dual outlets (20, 22) oriented with a circumferential component to inject an air-fuel mixture (24) into the combustor. The nozzle is effective to entrain the air-fuel mixture with the working gas (44) such that a peak temperature (46) of the working gas at a location downstream of the secondary fuel stage is less than a peak temperature (50) of working gas if the air-fuel mixture were injected into the combustor with a single outlet nozzle (118).

2 Claims, 5 Drawing Sheets

(56) References Cited

U.S. PATENT DOCUMENTS

| | | | | |
|---|---|---|---|---|
| RE30,925 E | * | 5/1982 | Smith | F23R 3/32 60/733 |
| 4,928,481 A | * | 5/1990 | Joshi | F23R 3/346 60/737 |
| 5,265,425 A | * | 11/1993 | Howell | F23R 3/14 60/736 |
| 5,735,115 A | * | 4/1998 | Maghon | F02K 3/10 60/39.826 |
| 5,746,048 A | * | 5/1998 | Shah | F23R 3/12 60/756 |
| 5,797,267 A | * | 8/1998 | Richards | F23R 3/346 60/737 |
| 5,826,429 A | * | 10/1998 | Beebe | F02B 51/02 60/723 |
| 6,047,550 A | * | 4/2000 | Beebe | F23L 7/00 60/733 |
| 6,092,363 A | | 6/2000 | Ryan | |
| 6,148,604 A | * | 11/2000 | Salt | F01D 9/023 60/39.37 |
| 6,253,555 B1 | * | 7/2001 | Willis | F23C 7/004 60/733 |
| 6,453,658 B1 | * | 9/2002 | Willis | F23R 3/16 60/746 |
| 6,868,676 B1 | * | 3/2005 | Haynes | F02C 3/14 60/740 |
| 7,303,388 B2 | * | 12/2007 | Joshi | F23D 14/22 239/601 |
| 7,886,539 B2 | | 2/2011 | Cai | |
| 7,886,545 B2 | * | 2/2011 | Lacy | F23R 3/286 60/39.37 |
| 8,240,150 B2 | * | 8/2012 | Varatharajan | F23R 3/14 60/737 |
| 8,281,594 B2 | * | 10/2012 | Wiebe | F23D 11/36 60/733 |
| 8,387,390 B2 | * | 3/2013 | Haynes | F23R 3/54 60/740 |
| 8,387,398 B2 | | 3/2013 | Martin et al. | |
| 8,429,915 B1 | * | 4/2013 | Hadley | F23R 3/10 60/737 |
| 8,904,796 B2 | * | 12/2014 | Singh | F23R 3/045 60/733 |
| 9,097,424 B2 | * | 8/2015 | Chen | F23R 3/045 |
| 9,140,455 B2 | * | 9/2015 | Stoia | F23R 3/286 |
| 9,154,743 B2 | * | 10/2015 | Hatcher, Jr. | G02B 23/2484 |
| 10,060,629 B2 | * | 8/2018 | Kim | F23R 3/286 |
| 2001/0049932 A1 | * | 12/2001 | Beebe | F23L 7/00 60/776 |
| 2003/0152880 A1 | * | 8/2003 | Eroglu | F23C 7/002 431/8 |
| 2005/0229604 A1 | | 10/2005 | Chen | |
| 2009/0077972 A1 | * | 3/2009 | Singh | F02C 7/222 60/737 |
| 2009/0084082 A1 | * | 4/2009 | Martin | F01D 9/023 60/39.281 |
| 2010/0008179 A1 | * | 1/2010 | Lacy | F23R 3/34 366/134 |
| 2010/0229557 A1 | * | 9/2010 | Matsumoto | F23R 3/34 60/737 |
| 2011/0079013 A1 | * | 4/2011 | Mehring | F02C 3/145 60/740 |
| 2011/0219776 A1 | * | 9/2011 | Bunker | F23R 3/20 60/772 |
| 2011/0289928 A1 | * | 12/2011 | Fox | F23R 3/286 60/740 |
| 2011/0296839 A1 | * | 12/2011 | Van Nieuwenhuizen | F23R 3/346 60/737 |
| 2011/0314825 A1 | * | 12/2011 | Stryapunin | F02C 7/22 60/737 |
| 2013/0008169 A1 | * | 1/2013 | Belsom | F01D 25/002 60/740 |
| 2013/0174558 A1 | * | 7/2013 | Stryapunin | F23R 3/286 60/734 |
| 2013/0283801 A1 | * | 10/2013 | Romig | F23R 3/28 60/733 |
| 2014/0116053 A1 | * | 5/2014 | Chen | F23R 3/045 60/737 |
| 2014/0182294 A1 | * | 7/2014 | Matsumoto | F23R 3/286 60/737 |
| 2014/0338359 A1 | * | 11/2014 | Valeev | F23L 7/00 60/776 |
| 2014/0352321 A1 | * | 12/2014 | Haynes | F01D 9/023 60/776 |
| 2015/0285501 A1 | * | 10/2015 | DiCintio | F23R 3/14 60/740 |
| 2016/0169524 A1 | * | 6/2016 | Widener | F02C 7/222 60/737 |
| 2017/0219212 A1 | * | 8/2017 | Laster | F23R 3/045 |

FOREIGN PATENT DOCUMENTS

| | | |
|---|---|---|
| CN | 103998745 A | 8/2014 |
| EP | 0805308 A1 | 11/1997 |
| JP | S47014519 A | 8/1972 |
| JP | H11257663 A | 9/1999 |
| JP | 2005344981 A | 12/2005 |
| JP | 2006010193 A | 1/2006 |

* cited by examiner

Axial Distance from Base plate ature area 156 of maximum temperature.
DUAL OUTLET NOZZLE FOR A SECONDARY FUEL STAGE OF A COMBUSTOR OF A GAS TURBINE ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to gas turbine engines, and more particularly to a nozzle positioned at a secondary fuel stage of a combustor of a gas turbine engine.

BACKGROUND OF THE INVENTION

In gas turbine engines, fuel is delivered from a fuel source to a combustion section where the fuel is mixed with air and ignited to generate hot combustion products that define working gases. The working gases are directed to a turbine section where they effect rotation of a turbine rotor. It has been found that the production of NOx gases from the burning fuel in the combustion section can be reduced by providing a portion of the fuel to be ignited downstream from a main combustion zone.

FIG. 1 illustrates a conventional combustor 112 of a can-annular combustion system included in a gas turbine engine 110. Pressurized air is mixed with fuel from main and pilot fuel injectors 166, 168 and ignited in a main combustion zone 143, creating combustion products comprising hot working gases 144. The combustor 112 further includes a secondary fuel stage 114 positioned at a secondary combustion zone 170 located downstream of the main combustion zone 143. The secondary fuel stage 114 includes nozzles 118 positioned to inject an air/fuel mixture into the secondary combustion zone 170. FIG. 2 illustrates conventional nozzles 118 used at the secondary combustion zone 170 of the combustor 112, with a single outlet to inject the air-fuel mixture.

BRIEF DESCRIPTION OF THE DRAWINGS

The invention is explained in the following description in view of the drawings that show.

DETAILED DESCRIPTION OF THE INVENTION

Figures 1, 2:
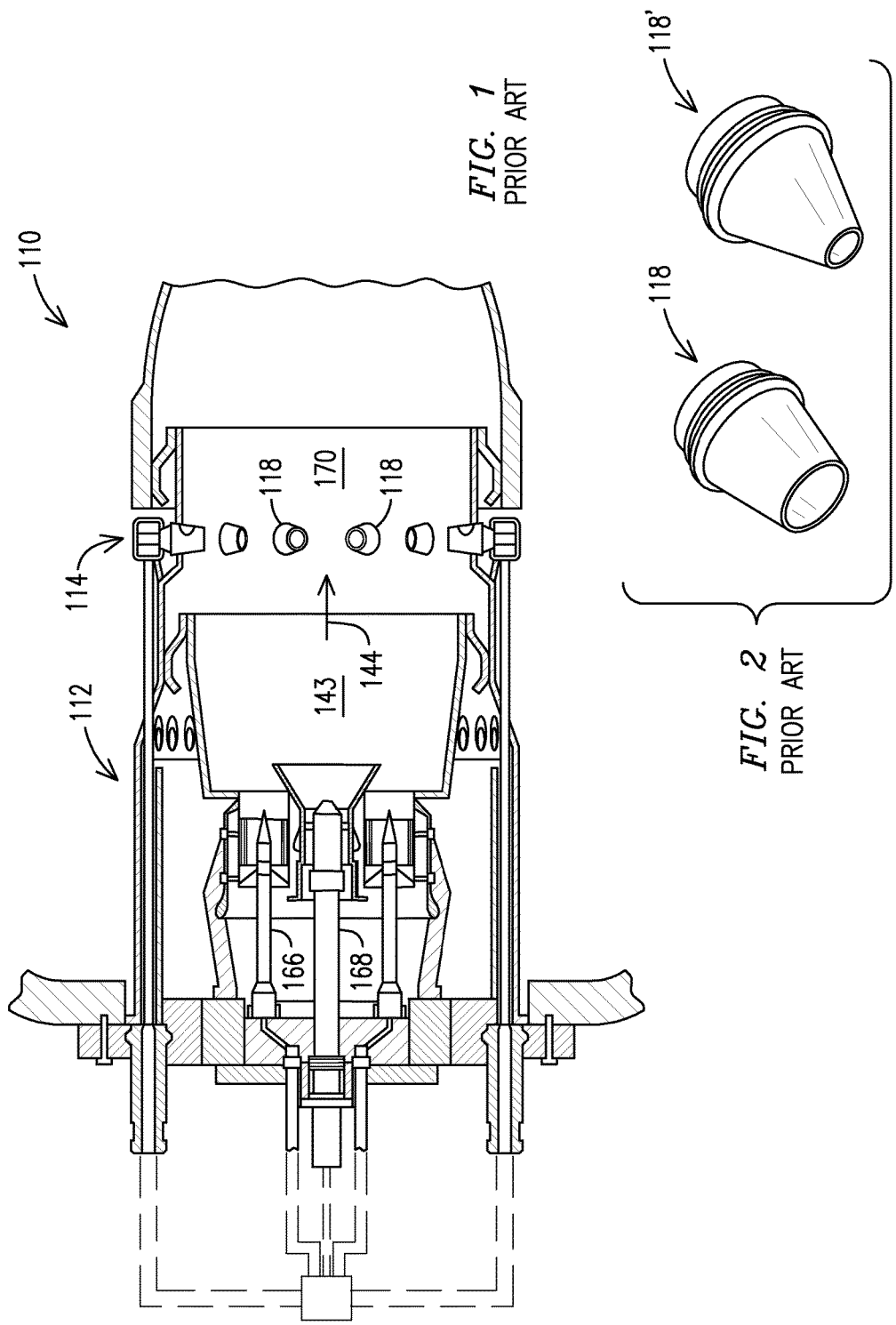
FIG. 1 is a cross-sectional side view of a conventional combustor used in a gas turbine engine.
FIG. 2 is a perspective view of a nozzle used in a secondary fuel stage of the combustor of FIG. 1.

The present inventors have recognized several limitations of the conventional nozzles 118 used at the secondary fuel stage 114 of the combustor 112. For example, the inventors recognized that the conventional nozzles 118 feature a single outlet without a circumferential component within the secondary combustion zone 170, resulting in limited circumferential mixing of the injected air/fuel mixture between adjacent nozzles 118. The inventors also recognized that this limited circumferential mixing between nozzles is even more pronounced for a low air split nozzle design 118' with a smaller opening (FIG. 2) to inject a rich air-fuel mixture.

Figure 3:
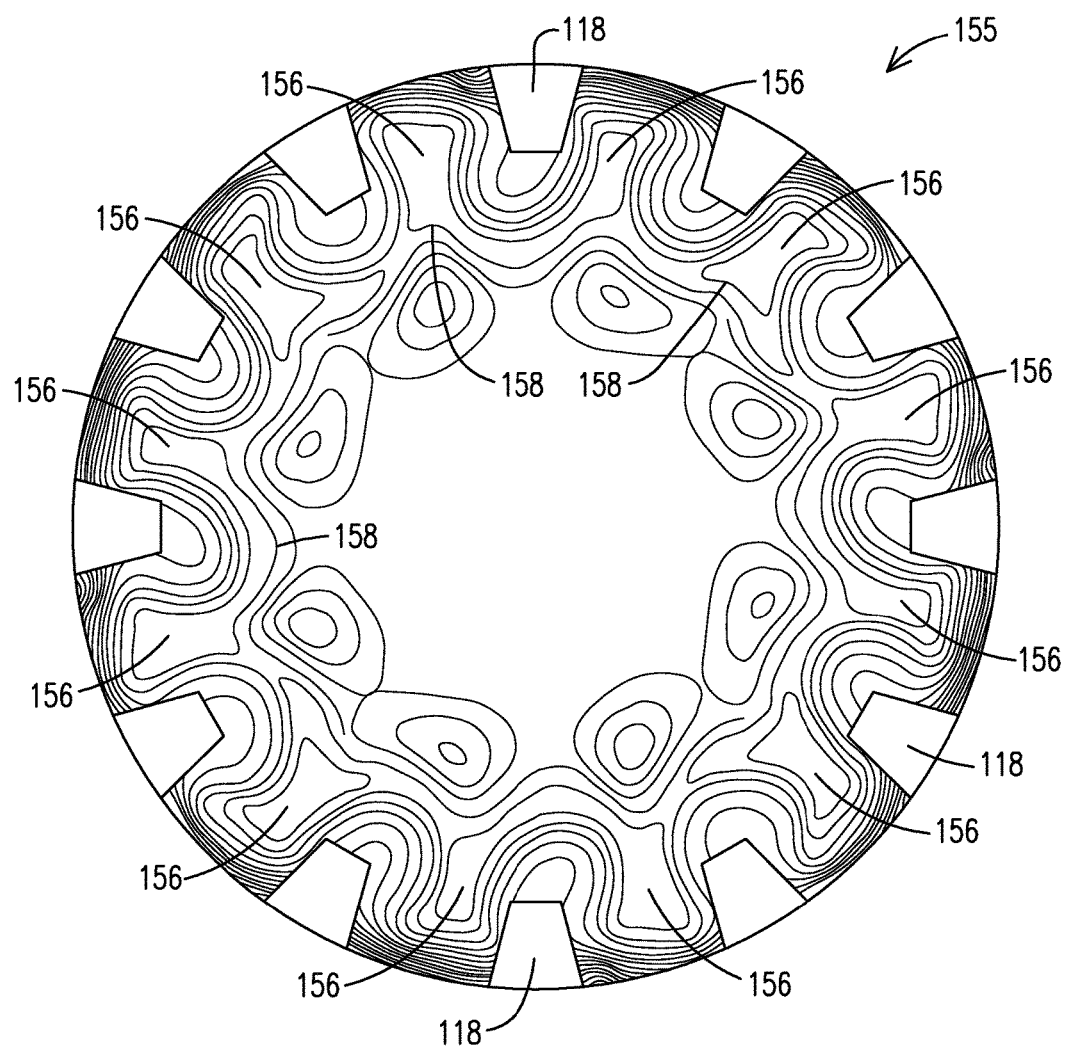
FIG. 3 is a temperature profile at a location downstream of the secondary fuel stage of the combustor of FIG. 1.

FIG. 3 illustrates a temperature profile 155 at a location downstream of the secondary combustion zone 170, including a peak temperature area 156 of maximum temperature. The inventors recognized that the peak temperature area 156 is located between the nozzles 118, as a result of the limited circumferential mixing between the nozzles 118. The inventors also recognized that the peak temperature area 156 is noticeably large. As appreciated by one skilled in the art, a larger peak temperature area 156 results in an increased maximum combustion temperature within the combustor 112, which in-turn causes higher levels of NOx production.

Based on these recognitions, the present inventors developed a dual outlet nozzle for a secondary fuel stage of a combustor, where the dual outlets have a circumferential component, to enhance circumferential mixing of the injected air/fuel mixture between adjacent nozzles. By improving the circumferential mixing of the injected air/fuel mixture between adjacent nozzles, the maximum combustion temperature in the combustor was reduced, which advantageously resulted in lower levels of NOx production. Additionally, unlike the conventional nozzle design, the improved dual outlet nozzle design enhanced circumferential mixing and lowered NOx production, irrespective of whether the nozzle design was adapted for a low or high air split (i.e. rich or lean air-fuel mixture).

Figure 4:
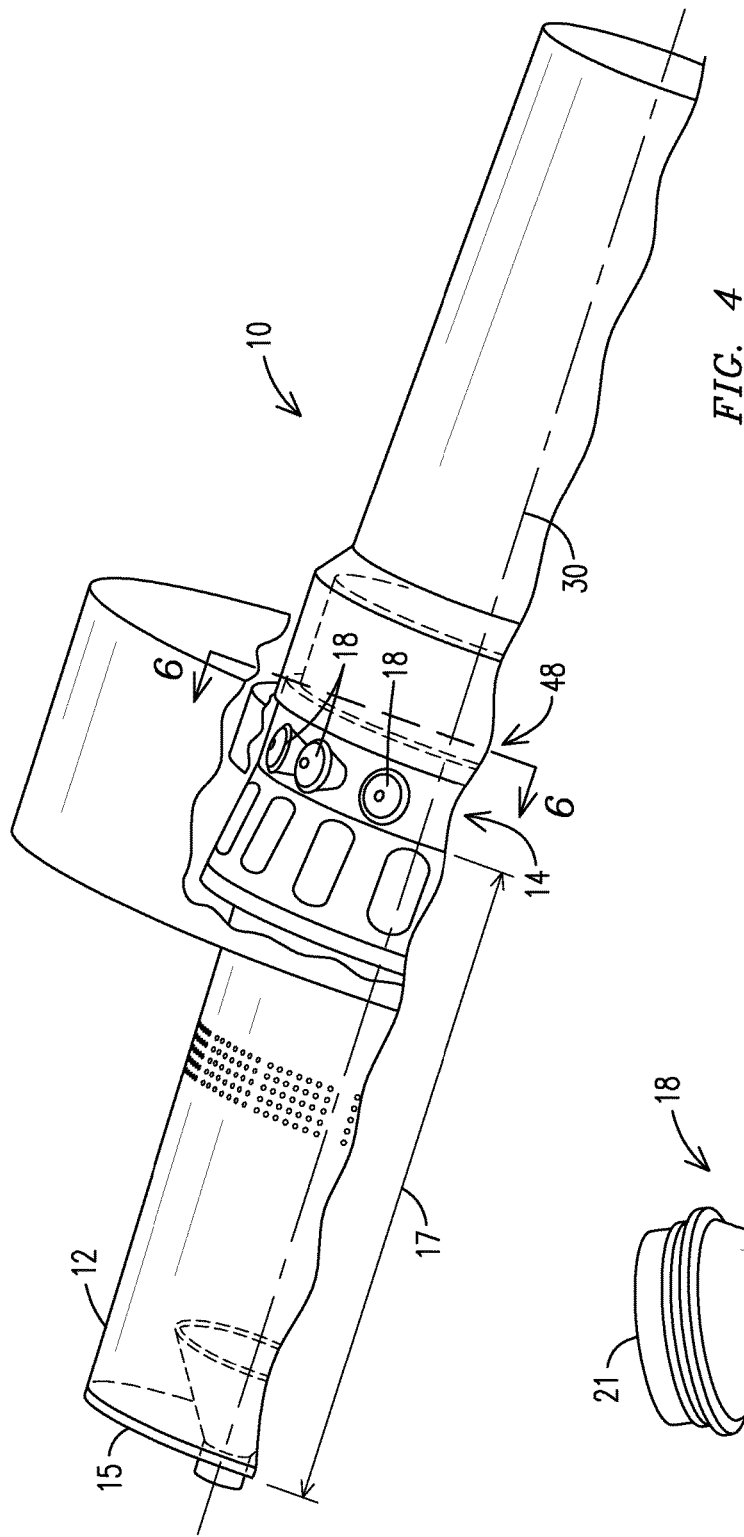
FIG. 4 is a cross-sectional side view of a combustor used in a gas turbine engine.

FIG. 4 illustrates a combustor 12 of a gas turbine engine 10, including a secondary fuel stage 14 for delivering fuel to the combustor 12. The secondary fuel stage 14 is separated by a distance 17 from a baseplate 15 along a longitudinal axis 30 of the combustor 12. As further illustrated in FIG. 4, a plurality of nozzles 18 are arranged at the secondary fuel stage 14, to inject an air-fuel mixture into the combustor 12. In an exemplary embodiment, the distance 17 is in a range of 0.5-3.5 times the diameter of the combustor 12, for example. However, the secondary fuel stage 14 may be separated by any distance from the baseplate 15 of the combustor 12, provided that the injected air-fuel mixture from the nozzles 18 at the secondary fuel stage 14 is effective to reduce the level of NOx production within the combustor 12.

Figure 5:
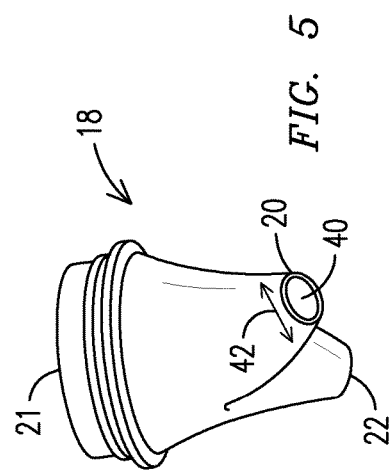
FIG. 5 is a perspective view of a nozzle used in a secondary fuel stage of the combustor of FIG. 4.

FIG. 5 illustrates the nozzle 18 with a single inlet 21 and dual outlets 20, 22. FIG. 5 further illustrates that the nozzle 18 defines an opening 40 with a cross-sectional width 42 that is selected to vary an air split, and thus vary an air-to-fuel ratio of the air-fuel mixture injected by the nozzle 18. As with the conventional nozzle 118, 118' designs of FIG. 2, the width 42 of the opening 40 may be increased to achieve a higher air split (i.e. leaner air-fuel ratio) and may be decreased to achieve a lower air split (i.e. richer air-fuel ratio).

Figure 6:
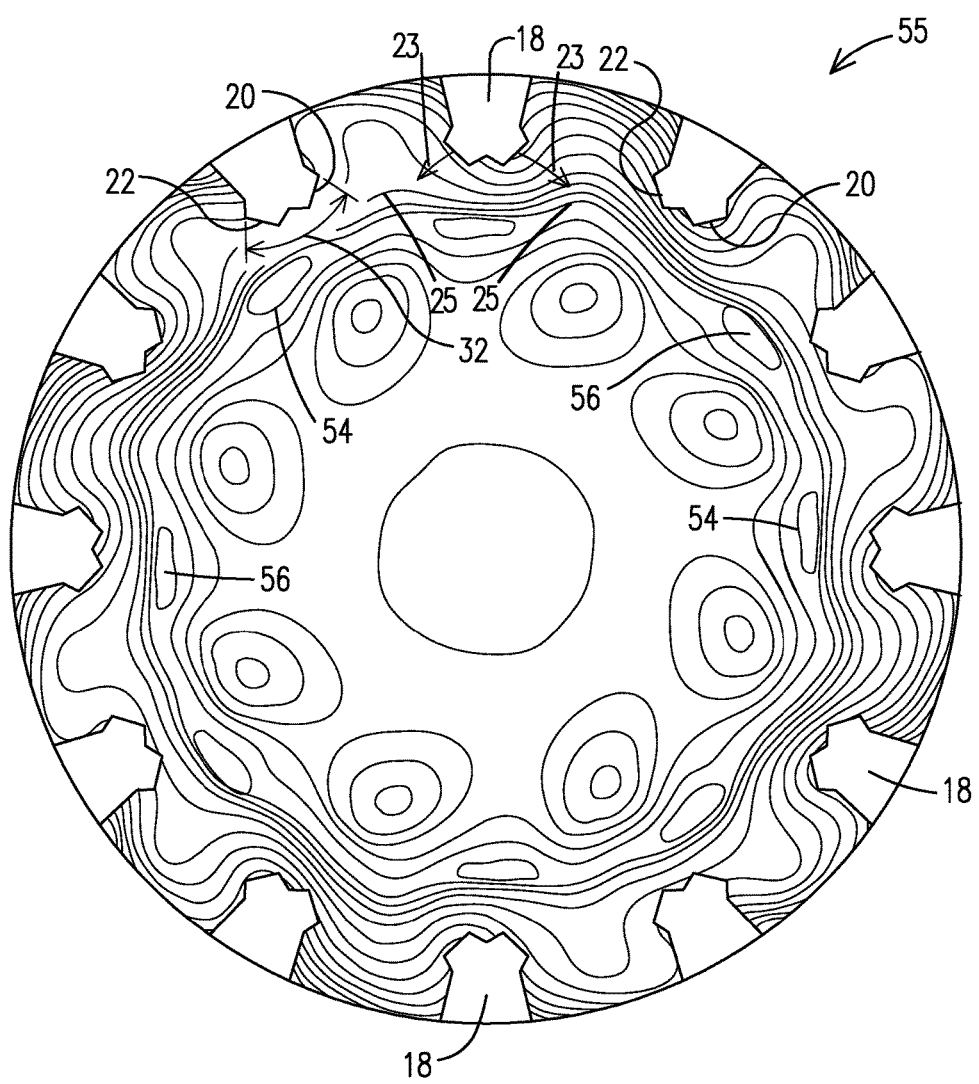
FIG. 6 is a temperature profile at a location downstream of the secondary fuel stage of the combustor of FIG. 4.

FIG. 6 illustrates that a plurality of the nozzles 18 are circumferentially arranged at the secondary fuel stage 14, in a plane orthogonal to the longitudinal axis 30 of the combustor 12, where each nozzle 18 includes the dual outlets 20, 22 oriented along respective directions 23 including a respective circumferential component 25 (i.e. in the plane of FIG. 6). Although FIG. 6 illustrates that twelve nozzles 18 are circumferentially spaced at the secondary fuel stage 14, the embodiments of the present invention are not limited to twelve nozzles and include any number of circumferentially spaced nozzles positioned at the secondary fuel stage 14. Although the dual outlets 20, 22 are depicted to be oriented in opposing circumferential directions, the dual outlets may be oriented in a same circumferential direction. Additionally, although the nozzle 18 preferably includes dual outlets 20, 22, the nozzle is not limited to dual outlets, and may have a single outlet or more than two outlets, provided that the outlets have a circumferential component in the plane orthogonal to the longitudinal axis 30 of the combustor 12. Additionally, FIG. 6 illustrates that the dual outlets 20, 22 of each nozzle 18 are separated by an angle 32 within the plane orthogonal to the longitudinal axis 30. In an exemplary embodiment, the angle 32 is in a range of 30-40 degrees, for example. However, the angle 32 is not limited to any specific angular range, provided that the dual outlets 20, 22 are oriented in the circumferential direction and the injected air-fuel mixture from the nozzles 18 is effective to reduce the level of NOx production within the combustor 12.

Figure 7:
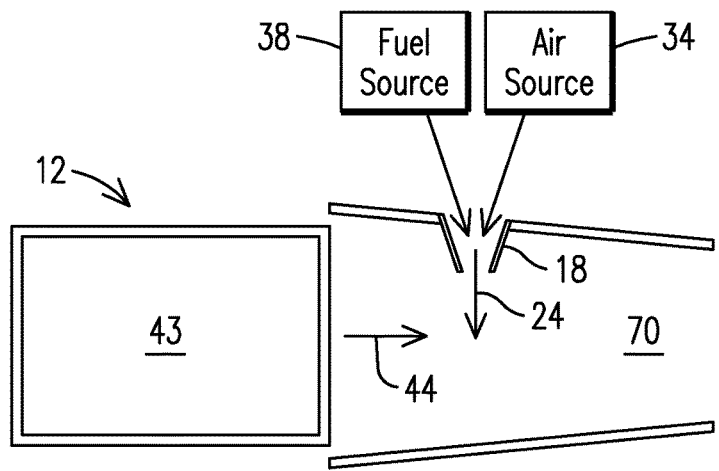
FIG. 7 is a schematic diagram of the combustor of FIG. 4.

FIG. 7 illustrates a schematic diagram of the combustor 12, including a main combustion zone 43 (similar to the main combustion zone 143 of FIG. 1), and a secondary combustion zone 70 (similar to the secondary combustion zone 170 of FIG. 1) positioned downstream of the main combustion zone 43, where the nozzles 18 are arranged, to inject an air-fuel mixture 24 into working gas 44 from the main combustion zone 43. FIG. 7 further illustrates that an air source 34 is coupled to the nozzle 18 to deliver air to the nozzle 18 and that a fuel source 38 is coupled to the nozzle 18 to deliver fuel to the nozzle 18. In an exemplary embodiment, the air source 34 may provide an air split of compressed air from a compressor (not shown) of the gas turbine engine 10. In another exemplary embodiment, the fuel source 38 may be a secondary fuel source that is coupled to a primary fuel source of the combustor 12 which delivers fuel to the main and pilot fuel injectors of the combustor 12, for example. The nozzle 18 is configured to mix the air and the fuel within the nozzle 18 such that the air-fuel mixture 24 is injected from the nozzle 18 and into the secondary combustion zone 70 of the combustor 12. In an alternate embodiment, the nozzle may be designed as an improvement of the fuel injector 38 disclosed in U.S. Patent Publication No. 2011/0289928, assigned to the assignee of the present application and incorporated by reference herein in its entirety, where the fuel injectors 38 are modified to have dual outlets with a circumferential component in the same manner as the dual outlets 20, 22 of the nozzle 18.

FIG. 6 illustrates a cross-sectional temperature profile 55 taken along the line 6-6 of FIG. 4 at a location 48 downstream of the secondary fuel stage 14. In an exemplary embodiment, the location 48 is positioned in a range of 1-3 exit diameters of the dual outlets 20, 22 of the nozzle 18 downstream of the secondary fuel stage 14, for example. However, the embodiments of the present invention are not limited to any specific downstream location 48 from the secondary fuel stage 14. The temperature profile 55 includes a peak temperature area 56 of the working gas (i.e., entrained air-fuel mixture 24 and working gas 44) at the location 48. The dual outlets 20, 22 of each nozzle 18 are oriented such that the peak temperature area 56 of the air-fuel mixture 24 at the location 48 has a convex perimeter 54. When the perimeter 54 is traversed in a clockwise direction, the slope of the perimeter 54 constantly varies in the clockwise direction. Similarly, when the perimeter 54 is traversed in a counter-clockwise direction, the slope of the perimeter 54 constantly varies in the counter-clockwise direction. Alternatively, the convex perimeter 54 may be based on the perimeter 54 being curved in an outward direction, around the perimeter. In contrast, the peak temperature area 156 in the conventional combustor 112 (FIG. 3) has a concave-convex perimeter 158, such that upon traversing the perimeter 158 in a clockwise direction, the slope varies in a clockwise direction over one portion of the perimeter 158 and varies in a counter-clockwise direction over another portion of the perimeter 158. Similarly, upon traversing the perimeter 158 in a counter-clockwise direction, the slope varies in a clockwise direction over one portion of the perimeter 158 and varies in a counter-clockwise direction over another portion of the perimeter 158.

Additionally, the peak temperature area 56 of the working gas within the combustor 12 covers an area that is less than a peak temperature area threshold. For example, the peak temperature area threshold may be the peak temperature area 156 of the temperature profile of the working gas in the conventional combustor 112 (i.e., the peak temperature area 156 of the working gas if the air-fuel mixture were injected by the single outlet nozzle 118), which is noticeably larger than the peak temperature area 56 of the working gas within the combustor 12. Furthermore, a percentage ratio of the peak temperature area 56 to a cross-sectional area of the secondary combustion zone 70 is less than a threshold percentage ratio. For example, the percentage ratio for the peak temperature area 56 may be in a range of 2-10%. However, the percentage ratio for the peak temperature profile 56 is not limited to any specific range. The threshold percentage ratio may be a percentage ratio of the peak temperature area 156 in the conventional combustor 112 (FIG. 3) to a cross-sectional area of the secondary combustion zone 170 of the combustor 112 if the air-fuel mixture were injected into the combustor 112 with the single outlet nozzle 118. For example, the percentage ratio for the peak temperature profile 156 may be in a range of 15-30%.

Figure 8:
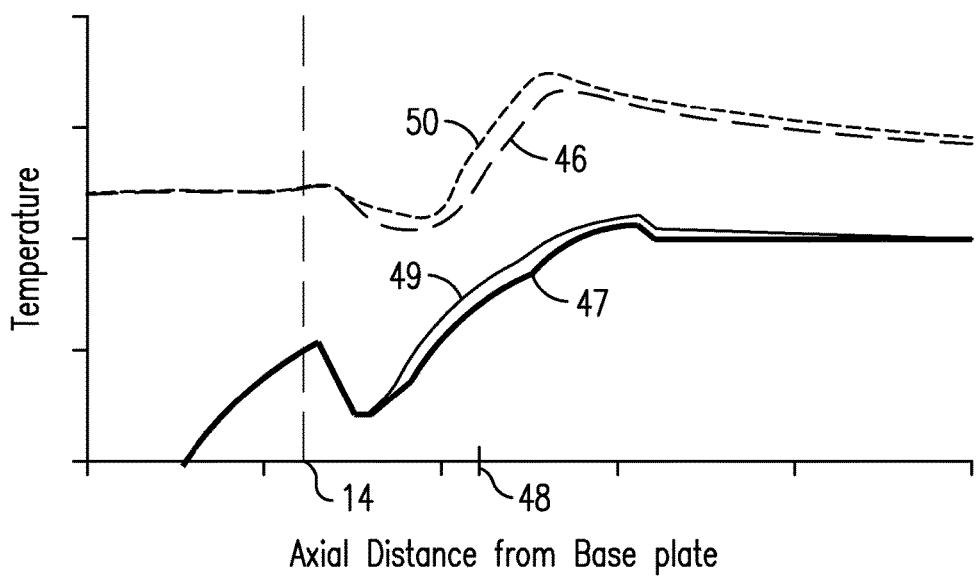
FIG. 8 is a plot of average and peak temperature downstream of the secondary fuel stage of the combustors of FIG. 1 and FIG. 4.

FIG. 8 illustrates a plot of a peak temperature 46 of the entrained injected air fuel mixture 24 from the dual outlets 20, 22 and working gas 44 downstream of the secondary fuel stage 14. FIG. 8 further illustrates a plot of a peak temperature 50 of the entrained injected air fuel mixture from the single outlets 118 of the conventional combustor 112 (FIG. 2) and working gas 144 downstream of the secondary fuel stage. The dual outlets 20, 22 of the nozzles 18 are oriented to entrain the injected air-fuel mixture 24 with the working gas 44 within the combustor 12 such that the peak temperature 46 at the location 48 downstream of the secondary fuel stage 14 is less than a temperature threshold. In one example, the temperature threshold is the peak temperature 50 of the entrained air fuel mixture injected from the single outlet nozzle 118 and working gas 144 in the conventional combustor 112 at the downstream location. FIG. 8 further illustrates an average temperature 47 of the entrained injected air fuel mixture 24 from the dual outlets 20, 22 and working gas 44 downstream of the fuel stage 14, and an average temperature 49 of the entrained air fuel mixture from the single outlet 118 of the conventional combustor 112 (FIG. 2) and working gas 144 downstream of the secondary fuel stage. Although the above embodiments discuss that the dual outlets 20, 22 of the nozzles 18 have a circumferential component at the secondary fuel stage 14, the outlets of the nozzle need not have a circumferential component, provided that the nozzle is effective to entrain the air-fuel mixture 24 with the working gas 44 such that the peak temperature profile 56 has a convex perimeter 54 and/or the peak temperature 46 of the entrained air-fuel mixture 24 and working gas 44 is less than the peak temperature 50 of the entrained air-fuel mixture from the single outlet nozzle 118 and the working gas.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine comprising:
a combustor with a main combustion zone to ignite working gas;
a primary fuel stage in fluid communication with said main combustion zone;
a secondary fuel stage positioned downstream of the main combustion zone, said secondary fuel stage comprising a nozzle configured as a split body nozzle comprising dual, curvilinear outlets to inject an air-fuel mixture into the combustor, the dual outlets oriented and adapted to direct a flow of said air-fuel mixture along respective directions including a respective circumferential direction proximate said dual outlets, in a plane orthogonal to a longitudinal axis of the combustor, the dual outlets arranged with a cross-sectional width selected to vary a dual split of the air-fuel mixture;
wherein the air-fuel mixture split along the respective directions including the respective circumferential outlet is configured to entrain the air-fuel mixture with the working gas such that a peak temperature profile has a convex perimeter.

2. A secondary fuel stage of a combustor of a gas turbine engine, said combustor with a main combustion zone in fluid communication with a primary fuel stage and upstream of the secondary fuel stage to ignite working gas, said secondary fuel stage comprising:
a nozzle configured as a split body nozzle with dual, curvilinear outlets to inject an air-fuel mixture into the combustor, the dual outlets oriented and adapted to direct a flow of said air-fuel mixture along respective directions including a respective circumferential direction proximate said dual outlets, in a plane orthogonal to a longitudinal axis of the combustor, the dual outlets arranged with a cross-sectional width selected to vary a dual split of the air-fuel mixture;
wherein the air-fuel mixture split along the respective directions including the respective circumferential direction is configured to entrain the air-fuel mixture with the working gas.

* * * * *